(12) United States Patent
Terada et al.

(10) Patent No.: US 7,758,230 B2
(45) Date of Patent: *Jul. 20, 2010

(54) SPREAD ILLUMINATING APPARATUS

(75) Inventors: Naoyuki Terada, Kitasaku-gun (JP);
Motoji Egawa, Kitasaku-gun (JP);
Akinobu Sano, Kitasaku-gun (JP)

(73) Assignee: Minebea Co., Ltd., Kitasaku-Gun (JP)

( * ) Notice: Subject to any disclaimer, the term of this patent is extended or adjusted under 35 U.S.C. 154(b) by 80 days.

This patent is subject to a terminal disclaimer.

(21) Appl. No.: 12/153,883

(22) Filed: May 27, 2008

(65) Prior Publication Data
US 2008/0316769 A1    Dec. 25, 2008

(30) Foreign Application Priority Data
Jun. 22, 2007    (JP)   ............................. 2007-165263

(51) Int. Cl.
*F21V 7/04*      (2006.01)

(52) U.S. Cl. ........................ 362/617; 362/327; 362/623; 349/65

(58) Field of Classification Search ................. 362/310, 362/327, 609, 617, 623–627; 349/65
See application file for complete search history.

(56) References Cited

U.S. PATENT DOCUMENTS 5,613,751 A * 3/1997 Parker et al. ................ 362/627

| | | | |
|---|---|---|---|
| 6,456,279 B1 * | 9/2002 | Kubo et al. .................. 345/173 |
| 7,268,770 B1 * | 9/2007 | Takahata et al. ............ 345/173 |
| 7,360,937 B2 * | 4/2008 | Han et al. .................... 362/608 |
| 2006/0276072 A1 * | 12/2006 | Fukasawa .................... 439/397 |
| 2008/0266881 A1 * | 10/2008 | Fujita et al. ................. 362/310 |
| 2008/0316769 A1 * | 12/2008 | Terada et al. ................ 362/617 |
| 2009/0040785 A1 * | 2/2009 | Shimura et al. ............. 362/609 |

FOREIGN PATENT DOCUMENTS

| JP | A-9-506837 | 7/1997 |
|---|---|---|
| JP | A-2005-302485 | 10/2005 |
| JP | A-2006-285171 | 10/2006 |

* cited by examiner

*Primary Examiner*—Sandra L O'Shea
*Assistant Examiner*—Meghan K Dunwiddie
(74) *Attorney, Agent, or Firm*—Oliff & Berridge PLC

(57) ABSTRACT

A spread illuminating apparatus includes an LED, a transparent resin plate and a light reflecting sheet, wherein the transparent resin plate includes slits adapted to have inserted therein flap portions of the light reflecting sheet, and wherein an adhesive tape with flexibility is placed along at least one flap portion of the light reflecting sheet so as to cover at least one slit of the transparent resin plate, whereby the light reflecting sheet is prevented from warping or undulating in spite of difference in thermal expansion coefficient between the materials of the transparent resin plate and the light reflecting sheet, and also whereby light emitted from the LED and traveling in the transparent resin plate is totally reflected by the flap portions and therefore prevented from leaking from the outer side surfaces of the transparent resin plate.

6 Claims, 10 Drawing Sheets

SPREAD ILLUMINATING APPARATUS

BACKGROUND OF THE INVENTION

1. Field of the Invention

The present invention relates to a spread illuminating apparatus of side light type, and particularly to a spread illuminating apparatus which includes a transparent resin plate composed integrally of a light conductor plate and a housing frame, and in which a means of fixing a light reflecting plate to the transparent resin plate has a flexible structure.

2. Description of the Related Art

A liquid crystal display (LCD) device is characterized by a small thickness, a small occupation volume, a light weight and the like and is used extensively in various electric products, such as a mobile telephone and a personal computer. Since a liquid crystal in the LCD device does not emit light by itself, an illuminating means is required when the LCD device is used at a place where a solar light or an illumination light is not fully available.

While the LCD device is requested to be further downsized, its display area is requested to be enlarged. In order to satisfy such requests at one time, the ineffective portion of a lighting means must be reduced, and also its power consumption is desired to be lowered, which is achieved by efficiently utilizing light from a light source.

Under the circumstance, recently, a spread illuminating apparatus has been developed in which a point light source, for example, a light emitting diode (LED) is used as a light source of a lighting means, or in which constituent members such as a light source, a light conductor plate and the like are fixedly disposed in place thereby efficiently utilizing light. Such the apparatus is generally requested to have a lower profile as a whole.

FIG. 11 shows a conventional spread illuminating apparatus of side light type in which LEDs 2 and a light conductor plate 1 having a substantially rectangular shape and adapted to receive light from the LEDs 2 are disposed in place by a housing frame 7 made of a white resin. Protrusions 12a and 12c are provided at each of side surfaces 11 and 12 of the light conductor plate 1 orthogonal to a side surface 8 at which the LEDs 2 are disposed while recesses 20a and 20c are provided at each of inner side surfaces of the housing frame 7 adapted to oppose the side surfaces 11 and 12 of the light conductor plate 1, and when the light conductor plate 1 is set in the housing frame 7, the protrusions 12a and 12c of the light conductor plate 1 engage respectively with the recesses 20a and 20c of the housing frame 7, whereby the light conductor plate 1 is fixedly disposed in place with respect to the housing frame 7 (refer, for example, to Japanese Patent Application Laid-Open No. 2005-302485).

In the engagement structure described above, however, a predetermined gap is required between the side surface 11/12 of the light conductor plate 1 and the inner side surface of the housing frame 7, and light loss attributable to the gap must be made up for by some measures. The white resin of the housing frame 7 has a smaller reflectance than a light reflecting plate which is constituted by a reflection film such as an enhanced specular reflector (ESR) (refer, for example, to Japanese Patent Application Laid-Open No. H9-506837), and some action must be taken to make up for light loss attributable to this low reflectance.

When the apparatus described above is further reduced in thickness, its entire rigidity becomes insufficient, and also it is likely to happen that the protrusions 12a and 12c of the light conductor plate 1 disengage from the recesses 20a and 20c of the housing frame 7.

FIG. 12 shows another conventional spread illuminating apparatus adapted to achieve a sufficient mechanical strength in the downsizing effort, which has an integrated structure of a light conductor plate portion 421 and a housing frame portion 422, where a pattern 426 is formed at a predetermined distance from light sources 410 (refer, for example, to Japanese Patent Application Laid-Open No. 2006-285171).

In the integrated structure described above, however, the housing frame portion 422 is to be made of a resin material of which the light conductor plate portion 421 is made and which has a high optical transmittance, and therefore light is caused to leak from the housing frame portion 422. In consideration of the light leakage problem, grooves 425 are provided at portions of the light conductor plate portion 421 located close to the housing frame portion 422, and light emitted from the light source 410 and traveling in the light conductor plate portion 421 is totally reflected by the groove 425.

Since polycarbonate or polymethylmethacrylate that is a common resin material for a light conductor plate has a refractive index of about 1.5 and has a relatively large critical angle, it may potentially happen that lot of lights emitted from the light source 410 and traveling in the light conductor plate impinge on the groove 425 at an angle smaller than the critical angle of the resin material depending on the design of constituent members, and the groove 525 does not sufficiently prevent the lights from leaking thus causing light loss.

Also, for preventing light leakage from the housing frame portion 422, a reflective film must be fixedly attached to the outer side surfaces of the housing frame portion 422 by some kind of method, and, for example, if a double face tape is used for fixed attachment, light is absorbed by the adhesive layers of the double face tape. Even if the reflective film can be fixedly attached without using a double face tape, light is inevitably absorbed and lost to some extent while traveling in the housing frame portion 422.

Referring to FIGS. 10A and 10B, in a spread illuminating apparatus in which a light conductor plate 101 is disposed inside a housing frame 102, and a light reflecting sheet 103 has its edge portion fixed to the housing frame 102 by a double face tape 104, the light reflecting sheet 103 undergoes warpage or undulation due to heat generated in the apparatus or coming from outside the apparatus, which results in lowering the brightness, causing light leakage, and deteriorating the aesthetic appearance. This warpage and undulation problem is attributable to the fact that the material of the light reflecting sheet 103 has a thermal expansion coefficient different from that of the material of the housing frame 102 (the material of the light reflecting sheet 103 has a larger thermal expansion coefficient than other constituent members).

SUMMARY OF THE INVENTION

The present invention has been made in light of the above problems, and it is an object of the present invention to provide a spread illuminating apparatus of side light type in which a light conductor plate and a housing frame are integrated with each other thereby maintaining a sufficient mechanical strength and also preventing light from leaking from the housing frame portion while downsizing of the apparatus is achieved, and also in which the means for fixing a light reflecting sheet to the above integrated member has a flexible structure thereby preventing the light reflecting sheet from deforming due to the difference in thermal expansion coefficient between the materials of the constituent members.

According to an aspect of the present invention, there is provided a spread illuminating apparatus of side light type which includes: a transparent resin plate including slits provided at portions located inside outer side surfaces thereof; a light reflecting sheet disposed at a rear of the transparent resin plate and including a main body portion and flap portions extending from sides of the main body and bent up along the sides; and a light source disposed in an opening provided at one end of the transparent resin plate, wherein the light reflecting sheet is attached to the transparent resin plate with the flap portions inserted in the slits of the transparent resin plate and is fixed by a fixing means having a flexible structure.

In the aspect of the present invention, the fixing means may be constituted by at least one adhesive tape.

In the aspect of the present invention, the at least one adhesive tape may be made of a soft and flexible material.

In the aspect of the present invention, the at least one adhesive may be disposed along the side of the main body portion of the light reflecting sheet.

In the aspect of the present invention, the fixing means may include a boss formed at a slit wall of the transparent resin plate.

Accordingly, in the spread illuminating apparatus of side light type described above, since the light conductor plate and the housing frame are integrated with each other, a sufficient mechanical strength can be maintained and also light is prevented from leaking from the housing frame portion while downsizing of the apparatus is achieved, and also since the means for fixing the light reflecting sheet to the above integrated member has a flexible structure, the light reflecting sheet is prevented from deforming due to the difference in thermal expansion coefficient between the materials of the constituent members.

DETAILED DESCRIPTION OF THE INVENTION

Exemplary embodiments of the present invention will hereinafter be described with reference to the accompanying drawings.

Figure 1:
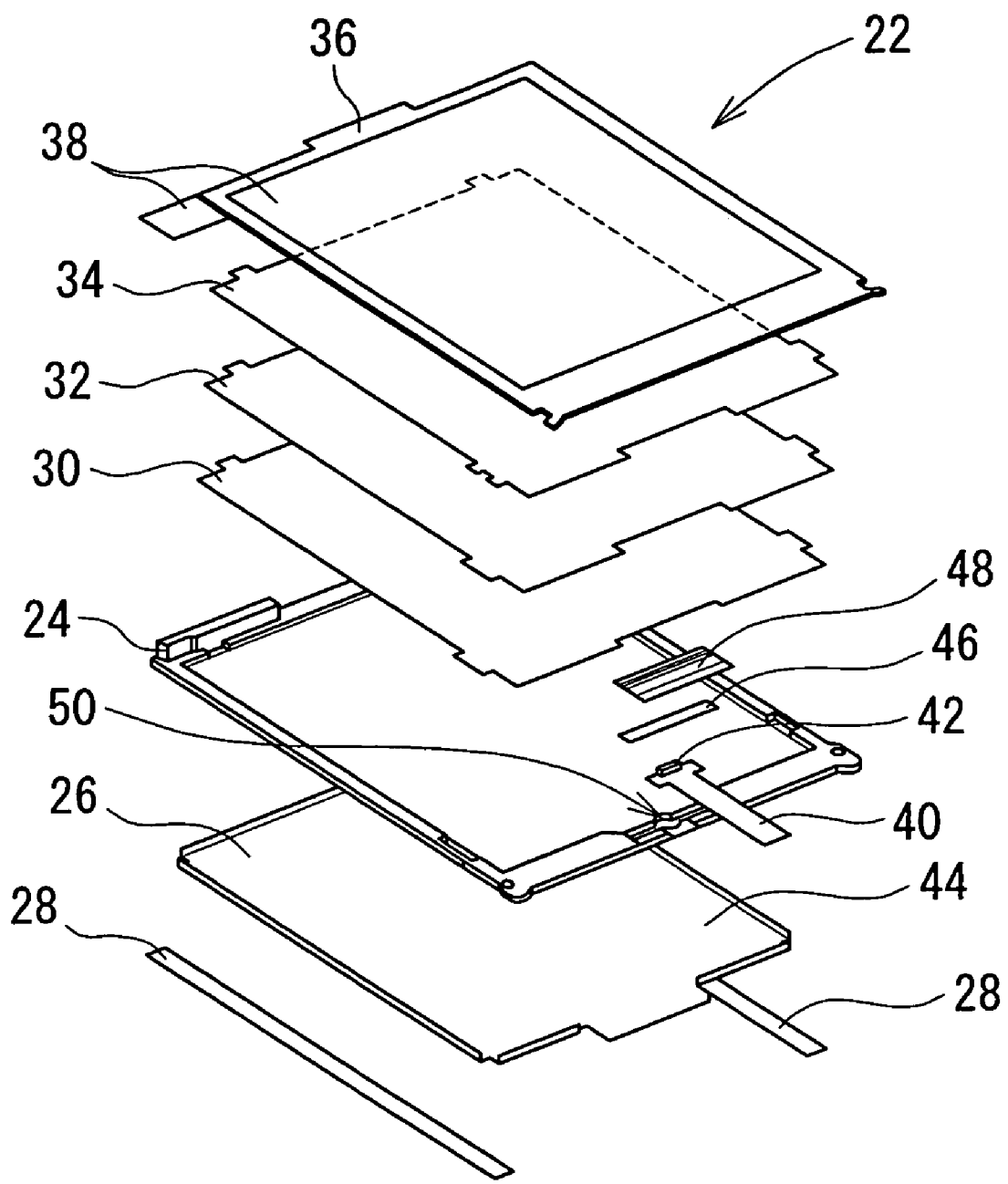
FIG. 1 is an exploded perspective view of a spread illuminating apparatus according to a first embodiment of the present invention.
Figure 2:
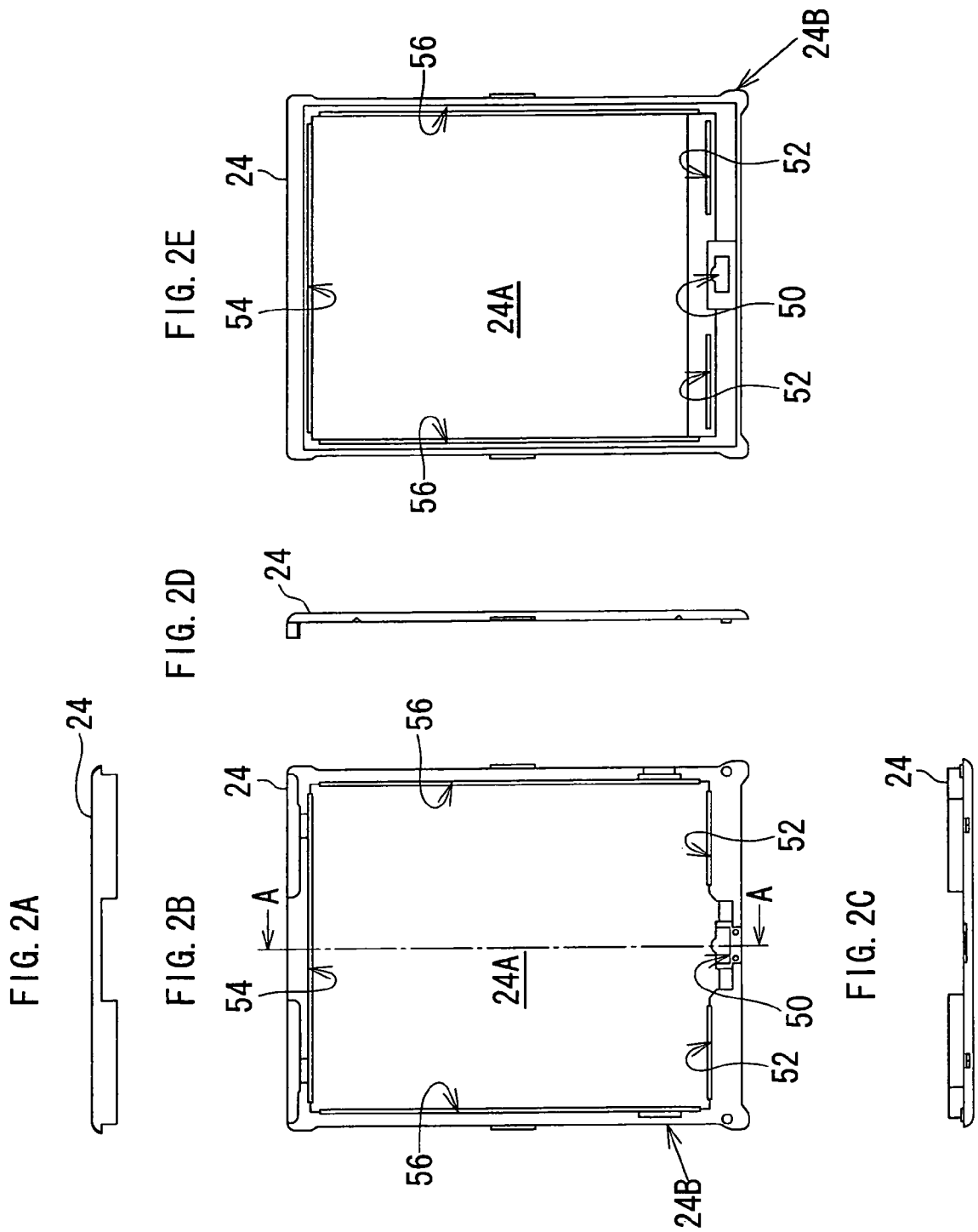
FIG. 2A is a front side view of a transparent resin plate of the spread illuminating apparatus of FIG. 1.
FIG. 2B is a top plan view of the transparent resin plate of FIG. 2A.
FIG. 2C is a rear side view of the transparent resin plate of FIG. 2A.
FIG. 2D is a right side view of the transparent resin plate of FIG. 2A
FIG. 2E is a bottom plan view of the transparent resin plate of FIG. 2A.

A first embodiment of the present invention will be described with reference to FIGS. 1 to 6A to 6C. Referring to FIG. 1, a spread illuminating apparatus 22 according to the first embodiment includes a transparent resin plate 24 and a light reflecting sheet 26 disposed at the rear of the transparent resin plate 24. The light reflecting sheet 26 is flexibly fixed with respect to the transparent resin plate 24 by adhesive tapes 28 as a fixing means. The spread illuminating apparatus 22 further includes a light diffusing sheet 30, prism sheets 32 and 34, and a light shielding sheet 38 superposed in this order on the front of the transparent resin plate 24. In this connection, a protection film 38 put on the light shielding sheet 36 for protection is to be peeled off when a liquid crystal panel is attached.

The transparent resin plate 24 includes a through opening 50 (to be described later) to firmly house an LED 42 (as a light source) mounted on a flexible printed circuit (FPC) 40. The LED 42 has a reflector 44 disposed at its rear and a reflector 46 at its front, and a black spacer 48 is put over the reflector 46 as a measure to prevent or suppress brightness non-uniformity at an area near the LED 42.

Referring to FIGS. 2A to 2B, the transparent resin plate 24 in the present embodiment is made of polycarbonate or polymethylmethacrylate such that a light conductor plate portion 24A and a housing frame portion 24B are integrated with each other. The aforementioned opening 50 to fixedly house the LED 42 is formed toward one side of the transparent resin plate 24 to be positioned inside the outer side surface.

Figure 3:
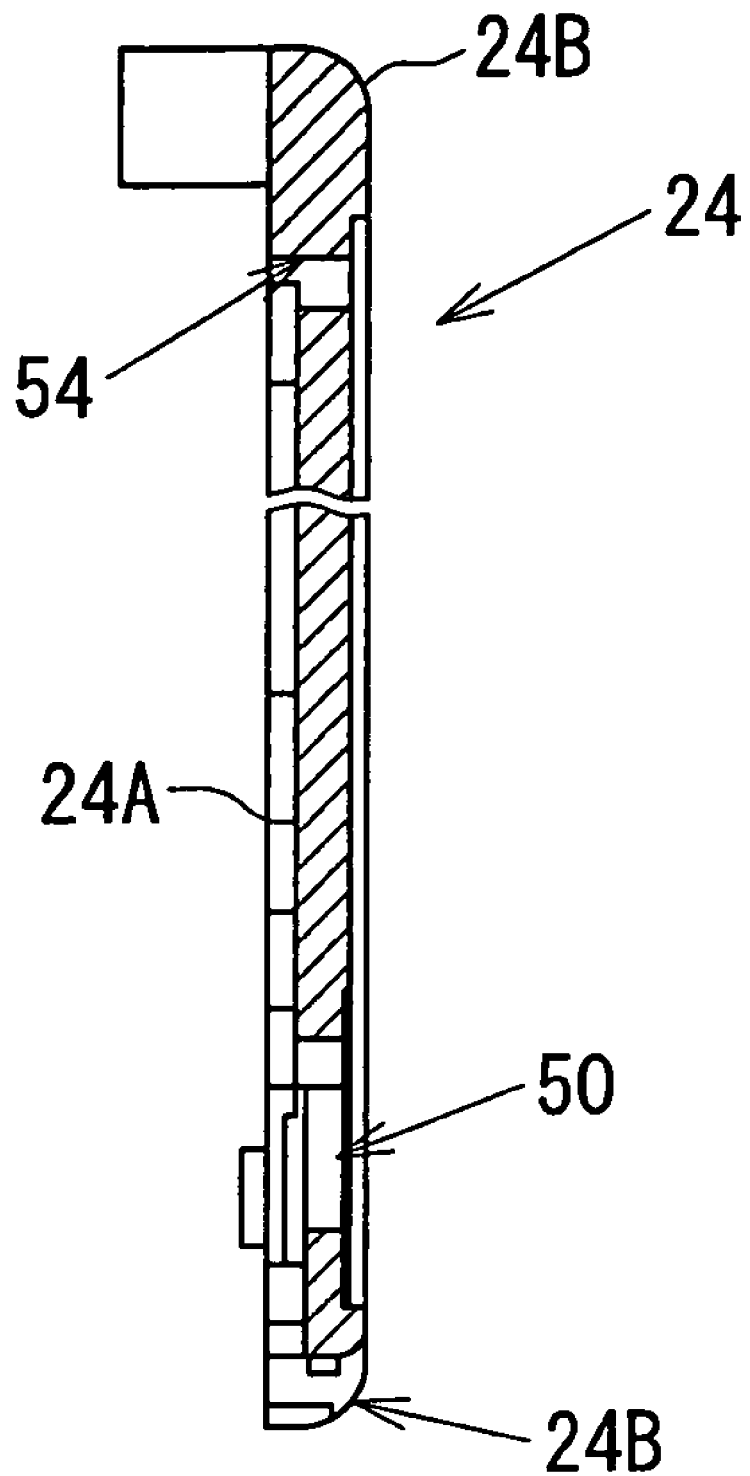
FIG. 3 is a schematic cross sectional view of FIG. 2B taken along line A-A.

Referring to FIG. 3, the light conductor plate portion 24A has at the rear thereof a recess for receiving the light reflecting sheet 26 and at the front thereof a recess for receiving the light diffusing sheet 30 and the prism sheets 32 and 34, and thus has a lower profile than the housing frame portion 24B.

Figure 4A:
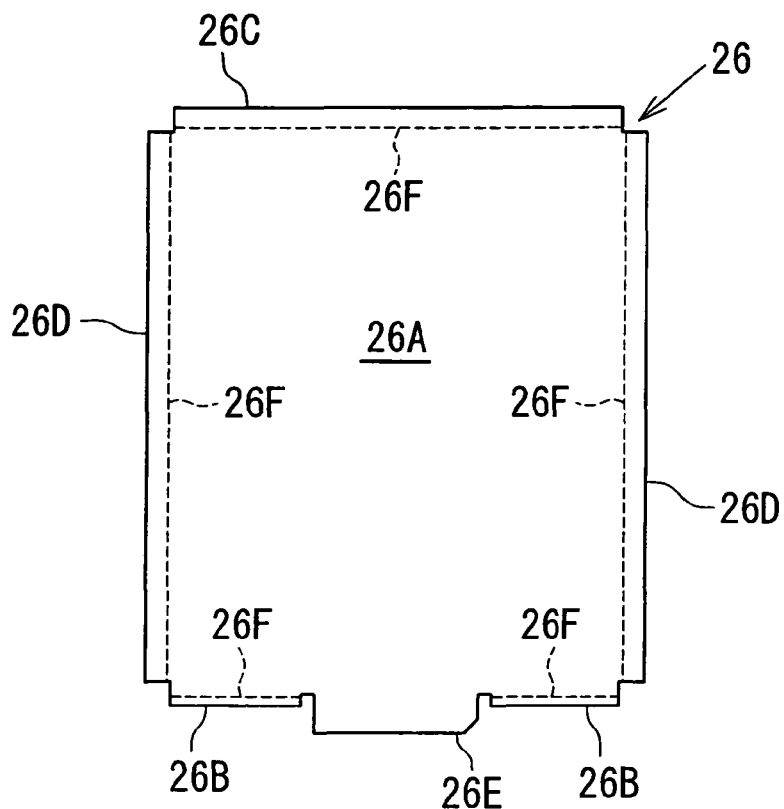
FIG. 4A is a development plan view of a light reflecting sheet of the spread illuminating apparatus of FIG. 1.
Figure 4B:
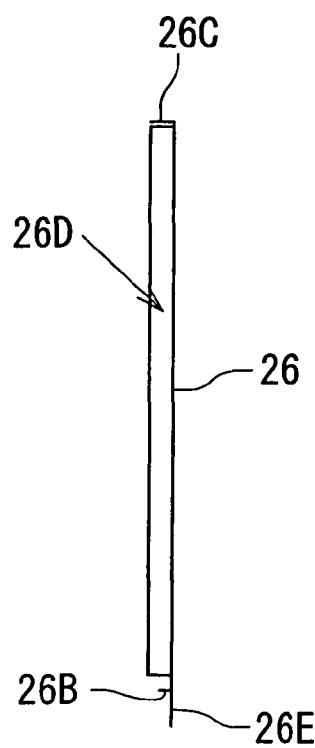
FIG. 4B is a side view of the light reflecting sheet of FIG. 4A with their flap portions folded.

Referring to FIGS. 4A and 4B, the light reflecting sheet 26 is an ESR film having a thickness of 0.065 mm and includes a rectangular main body portion 26A and flap portions 26B, 26B, 26C and 26D, 26D integrally disposed at the sides of the main body portion 26A and bent up along sides 26F (fold lines 26F) of the main body portion 26A, wherein the flap portions 26B, 26B are disposed toward the side of the transparent resin plate 24 having the opening 50, the flap portions 26C is disposed toward the side opposite to the side having the opening 50, and wherein the flap portions 26D, 26D are disposed toward the respective sides orthogonal to the side having the opening 50. The light reflecting sheet 26 further includes a protrusion 26E which extends from the side of the main body portion 26A having the flap portions 26B, 26B and which covers the rear of the opening 50.

The transparent resin plate 24 includes slits 52, 52, 54 and 56, 56 disposed at locations inside and close to the outer surfaces thereof so as to correspond respectively to the flap portions 26B, 26B, 26C and 26D, 26D as shown in FIGS. 2B and 2E, thus the slits 52, 52, 54 and 56, 56 constitute a boundary between the light conductor plate portion 24A and the housing frame portion 24B. The flap portions 26B, 26B, 26C and 26D, 26D of the light reflecting sheet 26 are inserted respectively in the slits 52, 52, 54 and 56, 56 as shown in FIG. 5 (only 26D, 26D and 56, 56 are shown).

In the structure described as above, the light reflecting sheet 26 is attached to the transparent resin plate 24 such that each of the adhesive tapes 28 is put on the light reflecting sheet 26 along the side 26F (fold line 26F) at the flap portion 26D of the main body portion 26A so as to cover each of the slits 56 of the transparent resin plate 24, whereby even if the constituent members, specifically the light reflecting sheet 26 and the transparent resin plate 24, expand or contract by respective amounts different from one another under the environmental change, the difference in thermal expansion coefficient between the material of the light reflecting sheet 26 and the material of the transparent resin plate 24 can be absorbed causing no stress concentration, and the light reflecting sheet 26 is prevented from warping or undulating.

Figure 5:
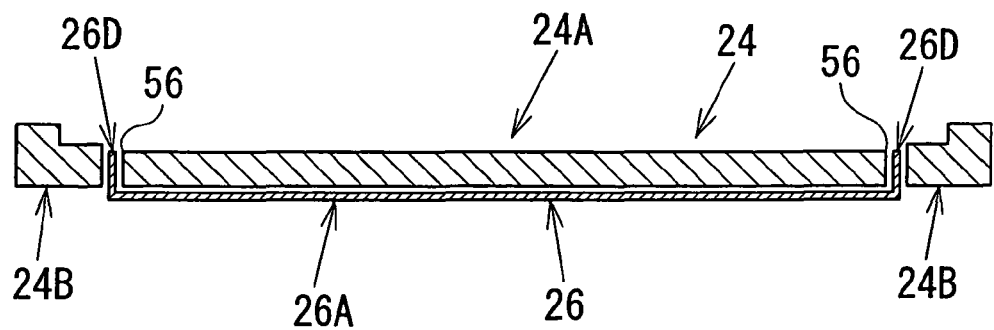
FIG. 5 is a schematic cross sectional view of the spread illuminating apparatus of FIG. 1.
Figure 6A:
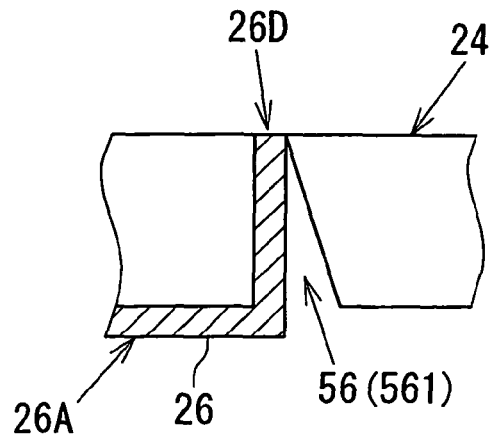
FIGS. 6A, 6B and 6C are schematic cross sectional views of slit configuration variations in the transparent resin plate.
Figure 6B:
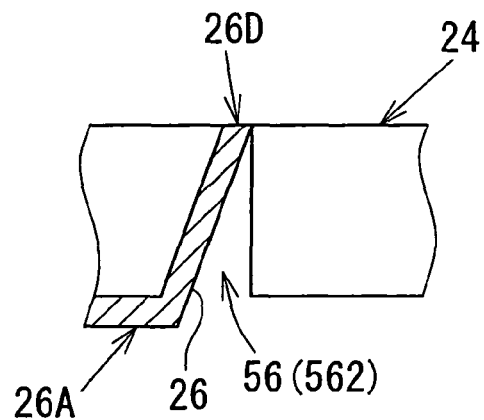
Figure 6C:
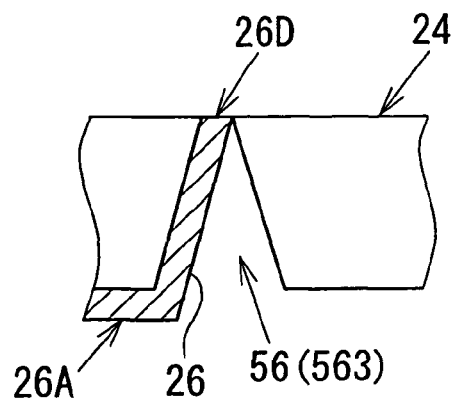

Referring to FIG. 5, the slits 52, 52, 54 and 56, 56 have a constant width from the front to the rear (only the slits 56, 56 are shown in the figure), but may have a smaller width at the front than at the rear as shown in FIGS. 6A to 6C, wherein one slit wall is tilted with respect to the front or rear surface of the transparent resin plate 24 in FIGS. 6A and 6B, and two slit walls are tilted in FIG. 6C.

In the case of FIGS. 6B and 6C, the bending angle of the flap portion 26D may be originally set corresponding to the tilt angle of the slit wall, or may be originally set at right angle to the front or rear surface of the main body portion 26A and then resiliently increased to the tilt angle while the flap portion 26D is pressed against the slit wall. Also, the slit wall does not have to be straight in cross section as shown in FIGS. 6A to 6C but may alternatively be curved.

The flap portions 26B, 26B, 26C and 26D, 26D of the light reflecting sheet 26 and the slits 52, 52, 54 and 56, 56 of the transparent resin plate 24 do not necessarily have to be oriented parallel to the outer side surfaces of the transparent resin plate 24 in cross section and may be appropriately arranged in consideration of crystal panel shape, brightness distribution and the like. Also, the flap portions 26B, 26B, 26C and 26D, 26D and also the protrusion 26E do not have to be formed integrally with the main body portion 26A but may alternatively be formed discretely therefrom.

The spread illuminating apparatus 22 includes only one opening 50 but may include two or more of the openings 50 each housing one LED 42 therein.

A second embodiment of the present invention will be described with reference to FIGS. 7A to 7C, where only a relevant portion of a spread illuminating apparatus is shown in a simplified manner, and any component parts corresponding to those in the preceding figures, though partly different therefrom, are denoted by the same reference numerals for explanation convenience.

Figure 7A:
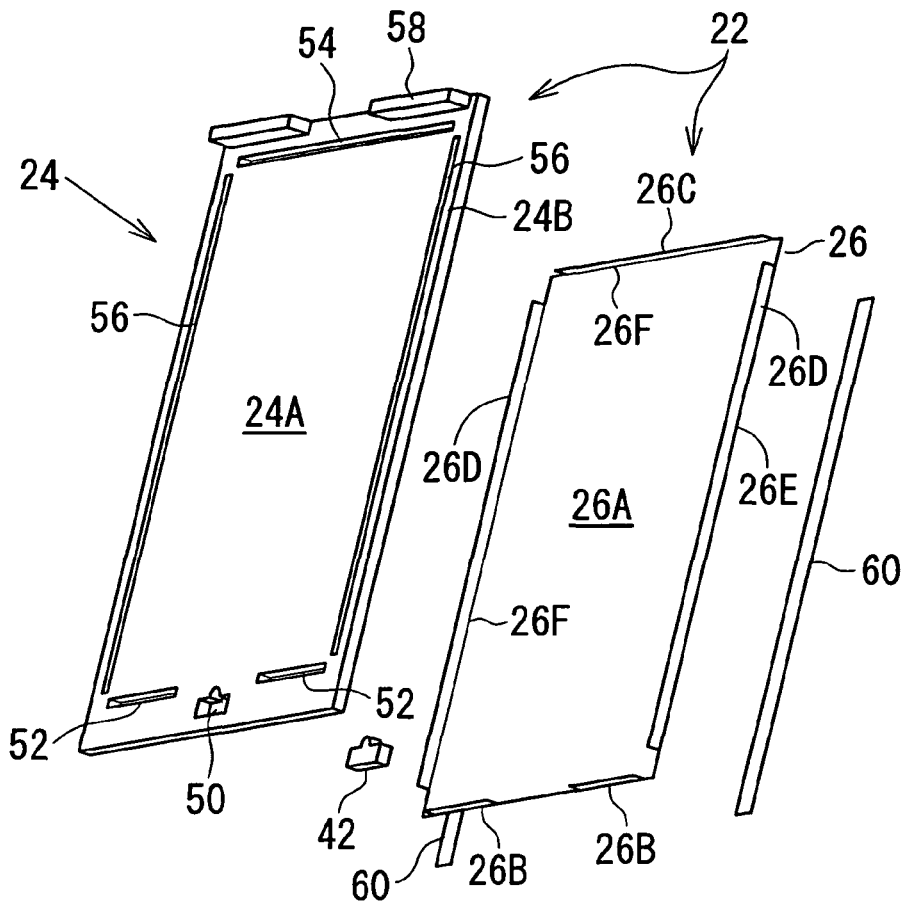
FIG. 7A is an exploded perspective view of a relevant portion of a spread illuminating apparatus according to a second embodiment of the present invention.

Referring to FIG. 7A, a spread illuminating apparatus 22 basically includes a transparent resin plate 24 and a light reflecting sheet 26. The transparent resin plate 24 is structured such that a light conductor plate portion 24A is integrated with a housing frame portion 24B, wherein a through opening 50 to house an LED 42 is formed at one end portion of the light conductor plate portion 24A, and projections 58 for attachment to another component are formed at the other end portion. The light reflecting sheet 26 in FIG. 7A has substantially the same structure as the light reflecting sheet 26 of FIGS. 4A and 4B according to the first embodiment but is not provided with the protrusion 26E.

Figure 7B:
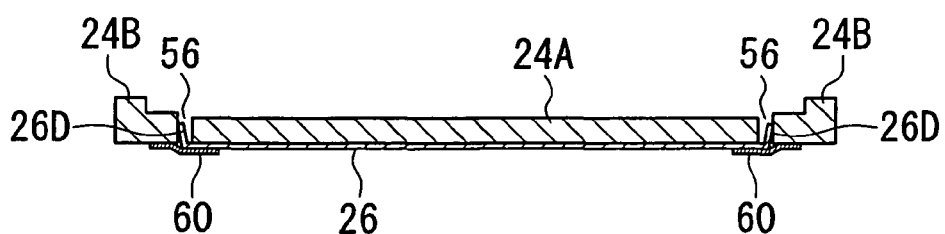
FIG. 7B is a schematic cross sectional view of the relevant portion of FIG. 7A.

Referring to FIG. 7B, the flap portions 26B, 26B, 26C and 26D, 26D (only 26D, 26D are shown) of the light reflecting sheet 26, which are bent at the right angle along fold lines 26F at the time of preparing the light reflecting sheet 26, are caused to unfold due to the restoring force of the light reflecting sheet 26 after inserted respectively in slits 52, 52, 54 and 56, 56 of the transparent resin plate 24, thus the flap portions 26D, 26D are shown to be tilted in the slits 56, 56.

After the flap portions 26B, 26B, 26C and 26D, 26D of the light reflector sheet 26 are inserted in the slits 52, 52, 54 and 56, 56 of the transparent resin plate 24, two adhesive tapes 60 are applied to the light reflecting sheet 26 respectively along the fold lines 26F of the flap portions 26D, 26D. At least one of the two adhesive tapes 60 is made of a soft and flexible material, and it is preferable that both of the two adhesive tapes 60 are made of a soft and flexible material.

In the spread illuminating apparatus 22 according to the second embodiment, in which the light reflecting sheet 26 is fixed to the transparent resin plate 24 by the adhesive tapes 60 made of a soft and flexible material as described above, the difference in thermal expansion coefficient between the material of the light reflecting sheet 26 and the material of transparent resin plate 24 can be further reliably absorbed.

An example of the spread illuminating apparatus 22 according to the second embodiment, in which the light reflecting sheet 26 has a thickness of 60 µm and the transparent resin plate 24 has a thickness of 500 µm, was subjected to an environmental test (thermal cycling test: 100 cycles of 80 degrees C. and −40 degrees C. with a duration time of 30 minutes for each cycle), and the light reflecting sheet 26 did not exhibit warpage or undulation.

The above-described adhesive tape 60 with flexibility may be an adhesive tape used for holding together a light conductor plate and a housing frame which are provided separately from each other.

Figure 7C:
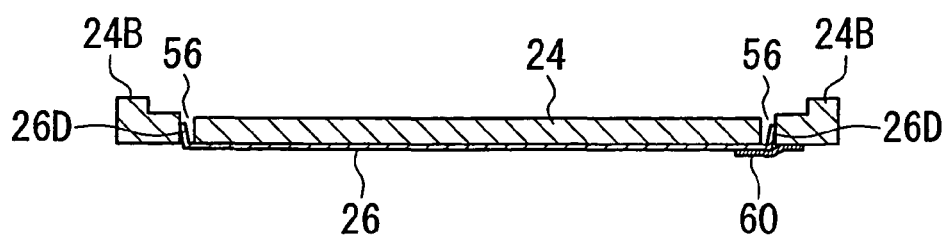
FIG. 7C is a schematic cross sectional view of FIG. 7B but with only one adhesive tape.

The light reflecting sheet 26 may be fixed to the transparent resin plate 24 by one adhesive tape 60 as shown in FIG. 7C, rather than by two. This fixing structure using one tape also allows the difference in expansion or contract amount of the constituent members to be absorbed. In this single tape fixing structure, the adhesive tape 60 does not necessarily have to be soft and flexible. In this connection, the flap portion 26D of the light reflecting sheet 26 disposed at a side of the transparent resin plate 24 not having the adhesive tape 60 can be duly held in a flexible manner in the slit 56 thanks to the restoring force, wherein if the slit 56 is configured as shown in one of FIGS. 6A to 6B, the flap portion 26D can be reliably held.

A third embodiment of the present invention will be described with reference to FIGS. 8 and 9. A spread illuminating apparatus according to the third embodiment differs from the spread illuminating apparatus 22 of the second embodiment in that a light reflecting sheet 26 (not shown in FIG. 8 or 9) is mechanically fixed to a transparent resin plate 24 instead of adhesively, that is, without using an adhesive tape.

Figure 8:
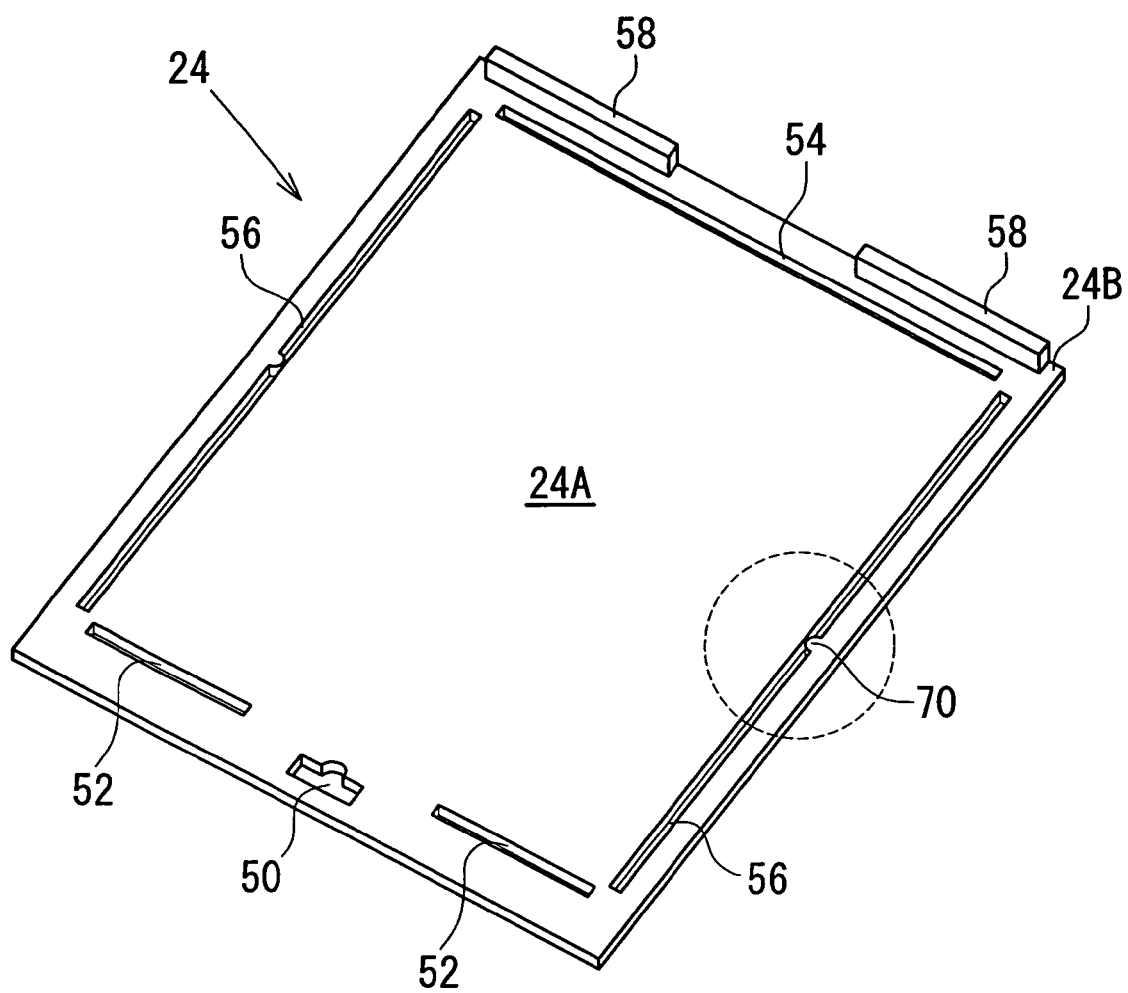
FIG. 8 is a perspective view of a transparent resin plate of a spread illuminating apparatus according to a third embodiment of the present invention.
Figure 9:
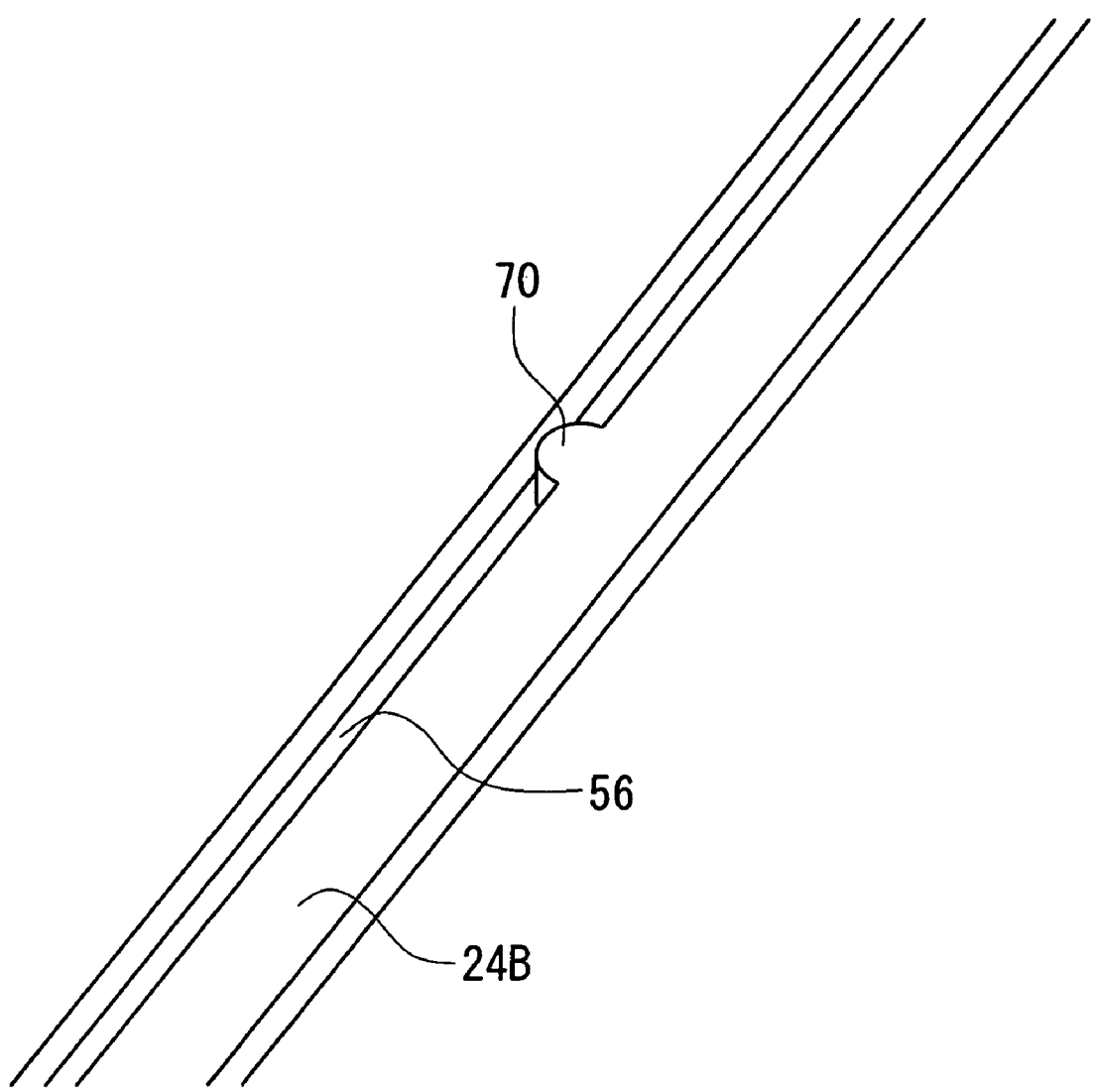
FIG. 9 is an enlarge view of an area circled by a dotted line in FIG. 8.
Figure 10A:
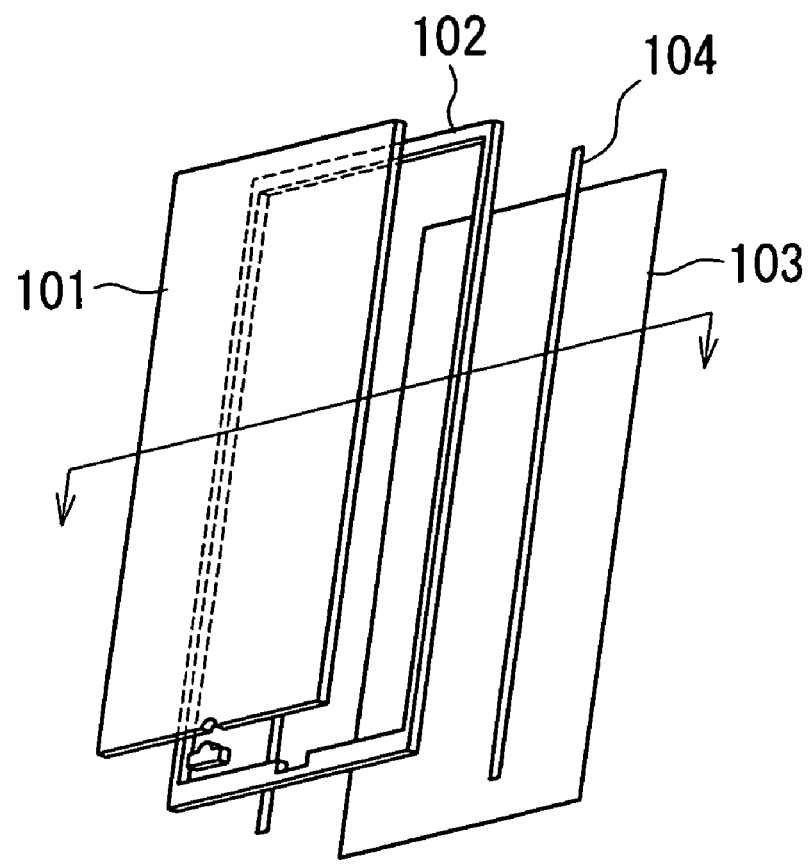
FIG. 10A is an exploded perspective view of a relevant portion of an conventional spread illuminating apparatus.
Figure 10B:
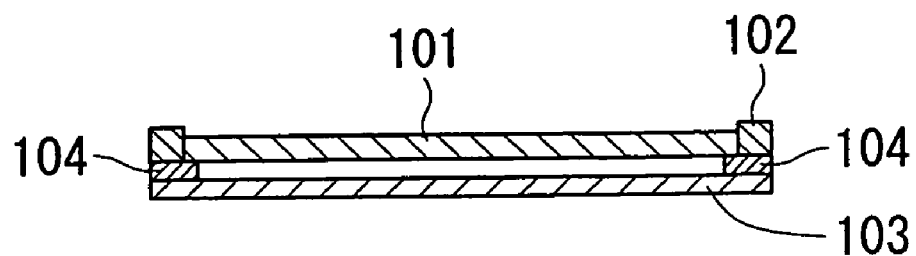
FIG. 10B is a schematic cross sectional view of the relevant portion FIG. 10A (put together)
Figure 11:
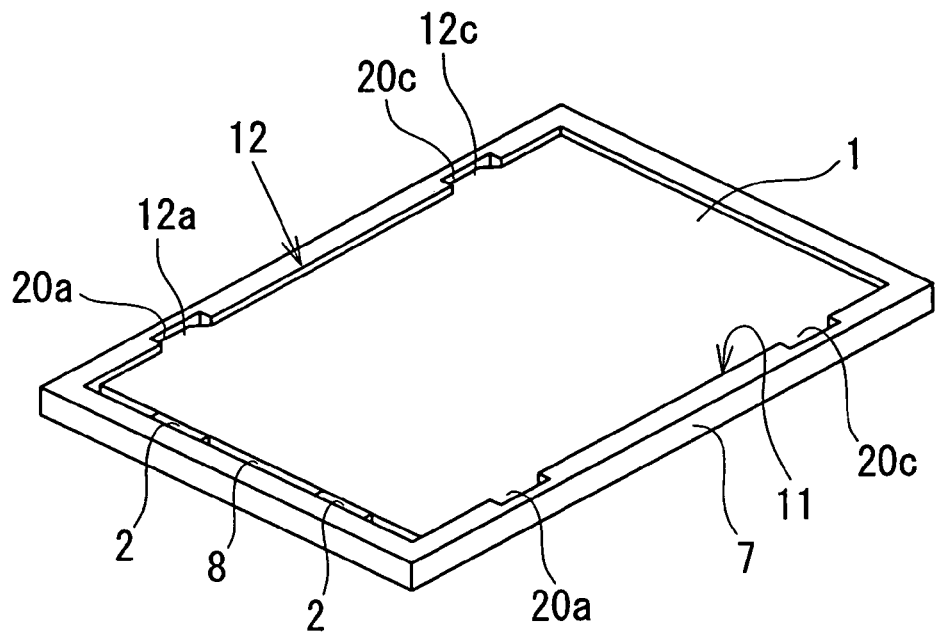
FIG. 11 is a perspective view of a relevant portion of another conventional spread illuminating apparatus where a light conductor plate and a housing frame are integrated with each other.
Figure 12:
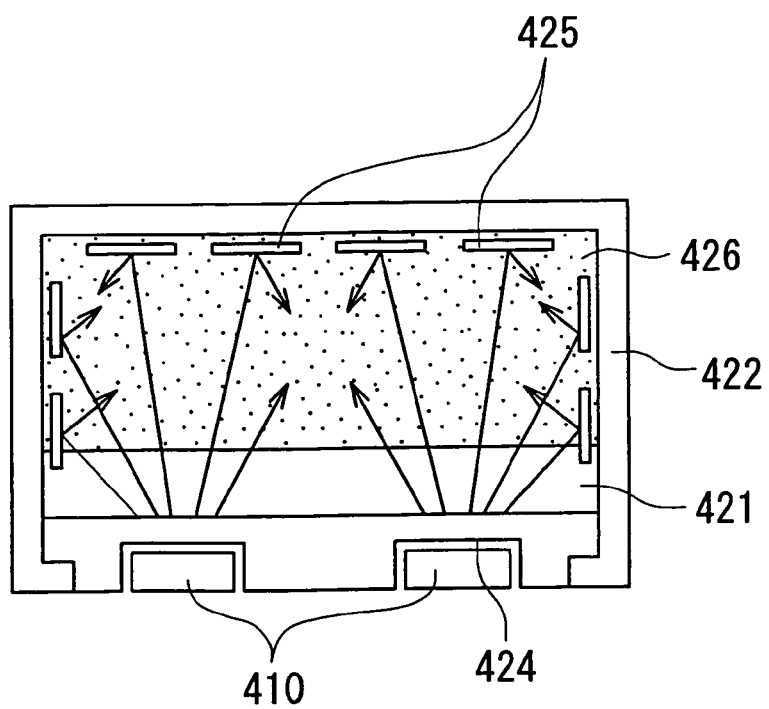
FIG. 12 is an explanatory top plan view of still another conventional spread illuminating apparatus where a light conductor plate and a housing frame are integrated with each other.

Referring to FIGS. 8 and 9, in the spread illuminating apparatus according to the third embodiment, a semicircular boss 70 is formed at the middle of a wall of each of slits 56 of the transparent resin plate 24, where the wall is constituted by the inner side surface of a housing frame portion 24B of the transparent resin plate 24. The housing frame portion 24B is narrow and thin along the slit 56 and therefore is elastically deformable. So, if the gap distance from the top of the semicircular boss 70 to a light conductor plate portion 24A of the transparent resin plate 24 is set smaller than the thickness of a flap portion 26D of the light reflecting sheet 26, the light reflecting sheet 26 can be reliably attached to the transparent resin plate 26 such that the flap portion 26D inserted in the slit 56 is duly held by the semicircular boss 70 due to the elastic force from the housing frame portion 24B.

In the fixing structure described above, even when the constituent components are caused to expand or contract by respective different amounts under the environmental change, the flap portion 26D of the light reflecting sheet 26 is adapted to resiliently slide with respect to the top of the semicircular boss 70, and therefore the light reflecting sheet 26 is prevented from warping or undulating.

Thus, in the spread illuminating apparatus according to the third embodiment, the process of precisely positioning and placing an adhesive tape is not required, and the numbers of components as well as processes can be reduced.

In the embodiment described above, one boss having a semicircular shape is provided at the middle of the slit wall, but the present invention is not limited to such an arrangement and the number, shape and position of bosses may be determined as appropriate.

According to the present invention, the following advantages can be achieved. Since the light reflecting sheet 26 is reliably attached to the transparent resin plate 24 by applying the adhesive tapes 60 with flexibility along the fold lines 26F of the flap portions 26D, 26D so as to cover the slits 56, 56 of the transparent resin plate 24, the difference in thermal expansion coefficient between the materials of the light reflecting sheet 26 and the transparent resin plate 24 can be absorbed, which effectively prevents the light reflecting sheet 26 from warping or undulating. If only one adhesive tape is used for fixing the light reflecting sheet 26, then the adhesive tape does not have to be fully soft and flexible for achieving the similar effect. Also, this effect can be achieved by forming the boss 70 at the wall of each of the slits 56, 56.

The present invention may be carried out by combining the structures described above. For example, the light reflecting sheet 26 can be fixedly attached to the transparent resin plate 24 such that one flap portion 26D is fixed by applying a tape (soft or stiff) while the other flap portion 26D is fixed by a boss formed at the slit 56, or such that both flap portions 26D, 26D are each fixed by a boss formed at each of the slits 56, 56 and at the same time at least one of the flap portions 26D, 26D is fixed by a soft adhesive tape.

In addition to the advantage described above, there is an advantage that the light reflecting sheets 26 can be surely set in place with respect to the transparent resin plate 24 by inserting the flap portions 26B, 26B, 26C and 26D, 26D respectively in the slits 52, 52, 54, and 56, 56.

Also, light emitted from the LED 42 and traveling in the light conductor plate portion 24A is totally reflected by the flap portions 26B, 26B, 26C and 26D, 26D inserted in the slits 52, 52, 54 and 56, 56, and therefore is surely prevented from leaking from the outer side surfaces of the transparent resin plate 24. Since the slits 52, 52, 54 and 56, 56 to have the flap portions 26B, 26B, 26C and 26D, 26D inserted therein are formed so as to cover most of the four sides of the light conductor plate portion 24A, light leakage from the outer side surfaces of the transparent resin plate 24 is mostly prevented.

The present inventors, et al. made comparison on central brightness, average brightness and brightness uniformity between the spread illuminating apparatus 22 provided with the flap portions 26B, 26B, 26C and 26D, 26D of the light reflecting sheet 26 and a comparative example without such flap portions.

The comparison shows that the spread illuminating apparatus 22 has a central brightness of 2501 cd/m, an average brightness of 2442 cd/mm and a brightness uniformity of 74.4% while the comparative example has a central brightness of 1938 cd/m, an average brightness of 1862 cd/m and a brightness uniformity of 57.9%, which verifies that light is effectively utilized without leaking from the outer surface of the transparent resin plate 24 of the spread illuminating apparatus 22.

If the slits 52, 52, 54 and 56, 56 of the transparent resin plate 24 are configured as shown in FIGS. 6A to 6C, specifically to have a larger width at the rear of the transparent resin plate 24 than at the front thereof, then the flap portions 26B, 26B, 26C and 26D, 26D of the light reflecting sheet 26 can be easily inserted into the slits 52, 52, 54 and 56, 56. Further, this slit configuration allows the tip ends of the flap portions 26B, 26B, 26C and 26D, 26D to be reliably set in place toward the front of the transparent resin plate 24, and also the gap between the side of the light conductor plate portion 24A and the flap portions 26B, 26B, 26C and 26D, 26D can be minimized or even eliminated thereby further enhancing the effective reflectance of the light reflecting sheet 26.

Since the opening 50 to house the LED 42 as a light source is located inside the outer side of the transparent resin plate 24, the LED 42 is to be positioned within the transparent resin plate 24. Accordingly, light emitted from the LED 42 and introduced in the light conductor plate portion 24A is totally reflected by the flap portions 26B, 26B, 26C and 26D, 26D and thereby prevented from leaking from the transparent resin plate 24.

And, if any of the flap portions 26B, 26B, 26C and 26D, 26D or the protrusion 26E are formed separately from the main body portion 26A, the freedom in selection of material and manufacturing process for the light reflecting sheet 26 can be increased, which contributes to enhancement of reflectance together with reduction of material and production cost.

What is claimed is:

1. A spread illuminating apparatus comprising
a transparent resin plate comprising slits provided at portions located inside outer side surfaces thereof;
a light reflecting sheet disposed at a rear of the transparent resin plate and comprising a main body portion and flap portions extending from sides of the main body and bent up along the sides; and
a light source disposed in an opening provided at one end of the transparent resin plate, wherein the light reflecting sheet is attached to the transparent resin plate with the flap portions inserted in the slits of the transparent resin plate and is fixed by a fixing means having a flexible structure.

2. A spread illuminating apparatus according to claim 1, wherein the fixing means is constituted by at least one adhesive tape.

3. A spread illuminating apparatus according to claim 2, wherein the at least one adhesive tape is made of a soft and flexible material.

4. A spread illuminating apparatus according to claim 2, wherein the at least one adhesive is disposed along the side of the main body portion of the light reflecting sheet.

5. A spread illuminating apparatus according to claim 1, wherein the fixing means comprises a boss formed at a slit wall of the transparent resin plate so as to press the flap portion of the light reflecting sheet.

6. A spread illuminating apparatus according to claim 1, wherein the fixing means is constituted by one adhesive tape disposed along one side of the main body portion of the light reflecting sheet.

* * * * *